United States Patent
Hansen et al.

(10) Patent No.: US 12,135,776 B1
(45) Date of Patent: Nov. 5, 2024

(54) SYSTEM AND METHOD FOR USER-SPECIFIC CAPTCHAS

(71) Applicant: UIPCO, LLC, San Antonio, TX (US)

(72) Inventors: Gregory David Hansen, Fuquay Varina, NC (US); Darrin Keith Wylie, San Antonio, TX (US); Lance David Brown, San Antonio, TX (US); Brittney Chiu Childers, San Antonio, TX (US); Liana Nicole Hamel, San Antonio, TX (US); Yolandra Jovan Hendrix, Dallas, TX (US); Karen Barnett Niemeyer, Helotes, TX (US); Evelyn Teresa Rimmer, San Antonio, TX (US)

(73) Assignee: United Services Automobile Association (USAA), San Antonio, TX (US)

(*) Notice: Subject to any disclaimer, the term of this patent is extended or adjusted under 35 U.S.C. 154(b) by 370 days.

(21) Appl. No.: 17/732,731

(22) Filed: Apr. 29, 2022

(51) Int. Cl.
*H04L 9/32* (2006.01)
*G06F 21/31* (2013.01)
*G06F 21/36* (2013.01)

(52) U.S. Cl.
CPC ............ *G06F 21/36* (2013.01); *G06F 21/316* (2013.01); *G06F 2221/2103* (2013.01); *G06F 2221/2133* (2013.01)

(58) Field of Classification Search
CPC .................. G06F 21/36; G06F 21/316; G06F 2221/2103; G06F 2221/2133
See application file for complete search history.

(56) References Cited

U.S. PATENT DOCUMENTS

| | | | |
|---|---|---|---|
| 8,621,578 B1* | 12/2013 | Blomquist | H04L 63/12 713/182 |
| 9,860,247 B2* | 1/2018 | Shuster | H04W 12/065 |
| 2010/0325706 A1* | 12/2010 | Hachey | G06F 21/36 713/170 |
| 2015/0347731 A1* | 12/2015 | Paxton | G06F 21/316 726/2 |
| 2016/0048662 A1* | 2/2016 | Arnoud | G06F 21/31 726/5 |
| 2018/0007049 A1* | 1/2018 | Palki | G06F 21/31 |
| 2018/0012138 A1* | 1/2018 | Heikell | G06F 21/316 |
| 2020/0065467 A1* | 2/2020 | Komnata | G06F 21/36 |
| 2020/0342879 A1* | 10/2020 | Carbune | G06F 40/30 |
| 2021/0264002 A1* | 8/2021 | Gras | G07C 9/32 |
| 2024/0061923 A1* | 2/2024 | Salisbury | G06F 21/316 |

* cited by examiner

*Primary Examiner* — Phy Anh T Vu
(74) *Attorney, Agent, or Firm* — Plumsea Law Group, LLC

(57) ABSTRACT

The embodiments provide a system and method for improved CAPTCHA challenges that utilize user-specific information. In some embodiments, personalized information about assets currently or previously owned assets, including properties and/or vehicles, are collected. The system then builds a dataset (a "user-specific CAPTCHA dataset") that is comprised of images including the user-owned assets. The user-specific CAPTCHA dataset can then be used to create personalized, or user-specific, CAPTCHA challenges that include images from the datatset. For systems that implement CAPTCHA challenges for multiple different users, each user-specific dataset may be associated to a particular user identifier (such as a username or email address).

13 Claims, 11 Drawing Sheets

SYSTEM AND METHOD FOR USER-SPECIFIC CAPTCHAS

TECHNICAL FIELD

The present disclosure generally relates to CAPTCHAs and, in particular, to CAPTCHAs that are specific to individual users.

BACKGROUND

A CAPTCHA (Completely Automated Public Turing test to tell Computers and Humans Apart) is a challenge-response test that is utilized to distinguish between input that has been generated by a human and input that has been generated by a machine. CAPTCHAs may be useful in preventing bots from accessing some kinds of computing resources, but over time better automated methods for circumventing CAPTCHAs have become more common.

Moreover, implementing CAPTCHAs as part of a login process can result in frustration for users who are often required to enter a username to provide identification, a password for authentication, and solve a CAPTCHA challenge to prove they are a human.

There is a need in the art for a system and method that addresses the shortcomings discussed above.

SUMMARY

In one aspect, a computing system for determining if access should be granted to a computing resource using a Completely Automated Public Turing Test to Tell Computers and Humans Apart (CAPTCHA) includes a processor and a non-transitory computer readable medium storing instructions that are executable by the processor. The instructions are executable to build and store a user-specific CAPTCHA dataset by (1) collecting historical asset information from a user, where the historical asset information includes information about assets that have been, or are currently, owned by the user, and storing, in memory, the collected historical asset information; (2) selecting a set of assets from the collected historical asset information; (3) retrieving, for each asset in the set of assets, a corresponding asset image; and (4) storing, in memory, the retrieved asset images, which together comprise the user-specific CAPTCHA dataset, and identifying the user-specific dataset with a user identifier for the user. The instructions are further executable to receive the user identifier, receive a request to classify the user's input as human input or machine input, and perform the requested classification by (1) retrieving a test criteria; (2) retrieving the user-specific CAPTCHA dataset according to the user identifier; (3) retrieving and displaying, for the user, a set of displayed images, where the set of displayed images includes at least some images from the user-specific CAPTCHA dataset; (4) receiving, from the user, a user selected set of asset images from the set of displayed images; and (5) allowing access to the computing resource when the user selected set of asset images matches the test criteria.

In another aspect, a computer implemented method for determining if access should be granted to a computing resource using a Completely Automated Public Turing Test to Tell Computers and Humans Apart (CAPTCHA), includes building and storing a user-specific CAPTCHA dataset by: (1) collecting historical asset information from the user, where the historical asset information includes information about assets that have been, or are currently, owned by the user, and storing, in memory, the collected historical asset information; (2) selecting a set of assets from the collected historical asset information; (3) retrieving, for each asset in the set of assets a corresponding asset image; and (4) storing, in memory, the retrieved asset images, which together comprise the user-specific CAPTCHA dataset, and identifying the user-specific CAPTCHA dataset with a user identifier for the user. The method also includes receiving the user identifier, receiving a request to classify the user's input as human input or machine input, and performing the requested classification by (1) retrieving a test criteria; (2) retrieving the user-specific CAPTCHA dataset according to the user identifier; (3) retrieving and displaying, for the user, a set of displayed images, where the set of displayed images includes at least some images from the user-specific CAPTCHA dataset; (4) receiving, from the user, a user selected set of asset images from the set of displayed images; and (5) allowing access to the computing resource when the user selected set of asset images matches the test criteria.

In another aspect, a computer implemented method for gathering images for use in a Completely Automated Public Turing Test to Tell Computers and Humans Apart (CAPTCHA) challenge includes receiving information about an asset owned by a user, submitting a query for an image including the information about the asset and receiving a returned image, applying machine learning to the returned image to detect an object matching the information about the asset, and upon failing to detect the object within the returned image using the machine learning algorithm, storing the returned image as an asset image, where the returned image is configured to be used in a CAPTCHA challenge for the user at a later time.

Other systems, methods, features, and advantages of the disclosure will be, or will become, apparent to one of ordinary skill in the art upon examination of the following figures and detailed description. It is intended that all such additional systems, methods, features, and advantages be included within this description and this summary, be within the scope of the disclosure, and be protected by the following claims.

BRIEF DESCRIPTION OF THE DRAWINGS

The invention can be better understood with reference to the following drawings and description. The components in the figures are not necessarily to scale, emphasis instead being placed upon illustrating the principles of the invention. Moreover, in the figures, like reference numerals designate corresponding parts throughout the different views.

DETAILED DESCRIPTION

Figure 1:
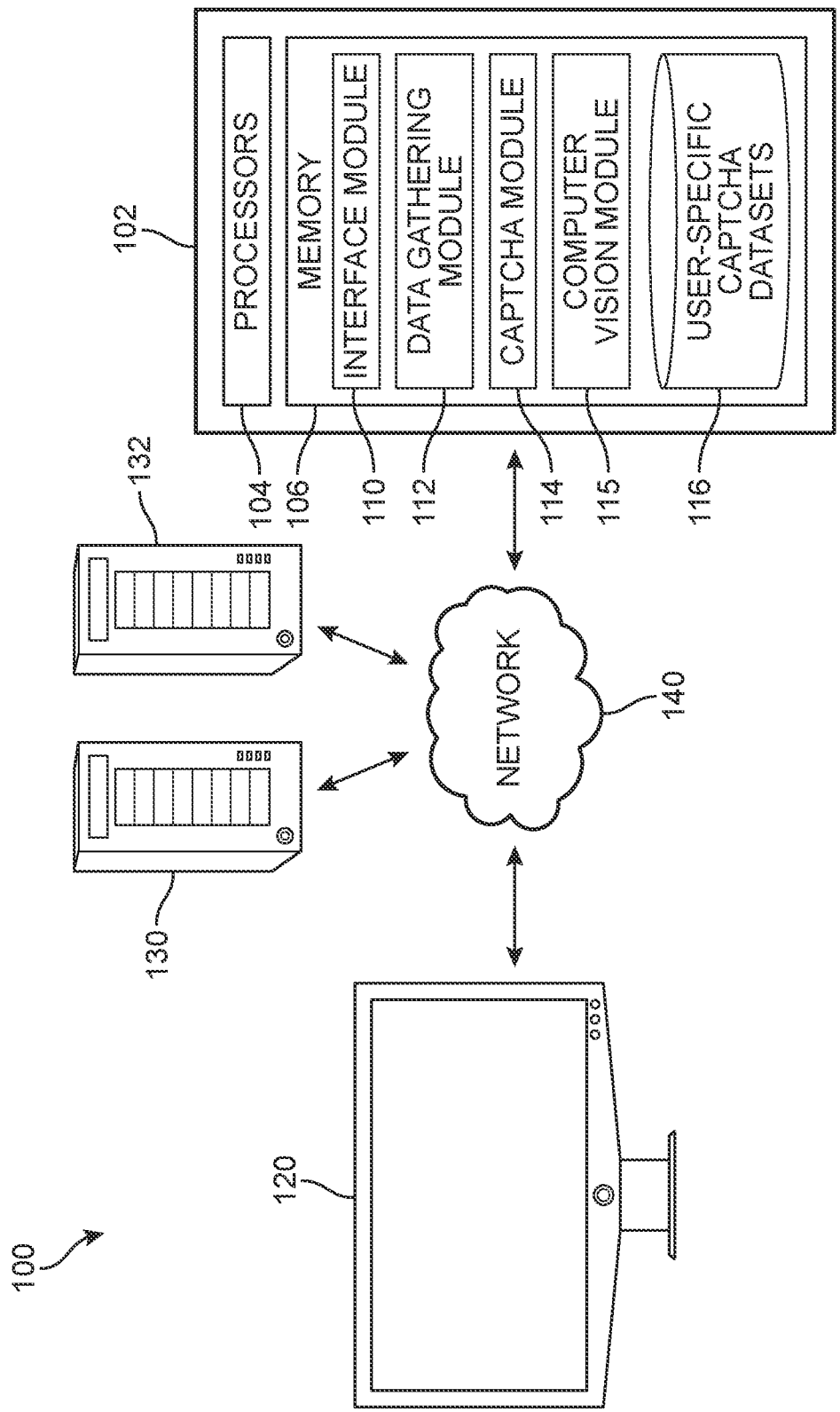
FIG. 1 is a schematic view of a configuration of systems for building and implementing user-specific CAPTCHA challenges, according to an embodiment.

The embodiments provide systems and methods for improved CAPTCHA challenges that utilize user-specific information. In some embodiments, personalized information about assets currently or previously owned (or leased or occupied) assets, including properties and/or vehicles, are collected. The system then builds a dataset (a "user-specific CAPTCHA dataset") that is comprised of images including the user-specific assets. The user-specific CAPTCHA dataset can then be used to create personalized, or user-specific, CAPTCHA challenges that include images from the datatset. For systems that implement CAPTCHA challenges for multiple different users, each user-specific dataset may be associated to a particular user identifier (such as a username or email address).

In one embodiment, a system implementing the CAPTCHA challenge could present images of six vehicles. The user could then be instructed to select which images include user-owned vehicles. In this case only some of the displayed images may include user-owned vehicles, while the remaining images are random images (also including vehicles) selected by the system.

In one embodiment of the exemplary CAPTCHA system, a system could display images for a user. The user may then be instructed to drag the images, at least some of which include user-owned assets, into a chronological sequence, according to the dates the user owned the vehicles. Similar tests could be implemented for houses or apartments. The system would provide images of multiple residences and the user would have to place the images in the order in which the user occupied those homes.

The embodiments provide improvements to existing CAPTCHA technology by incorporating user-specific information into the CAPTCHA challenges presented to users. Conventional CAPTCHA systems provide generic challenges that do not require knowing anything about the user, since authentication of the user (where needed) is performed as a separate step (for example, using a password). By incorporating user-specific information, the CAPTCHA challenges of the exemplary embodiments are made significantly more difficult to solve by a bot, since they require a bot to perform multiple complex tasks simultaneously. Specifically, the bot must first retrieve and understand semantic information about assets a user has owned. Second, the bot must detect, on the basis of the retrieved asset information, those same assets within a displayed image. Moreover, because each CAPTCHA challenge is specific to a given user, based on their asset ownership history, a bot that has solved one set of CAPTCHA challenges for a given user may not be able to solve a different CAPTCHA challenge for a different user, severely limiting the utility of the bot.

Moreover, the proposed methods and systems allow a user to be authenticated and identified as a human (vs. a machine) simultaneously, thereby simplifying the process of trying to access a computing resource (such as an account page).

The embodiments also provide methods for selecting complex images that are not easily amenable to conventional machine learning technologies, thereby improving the security of the system.

Various terms are gathered and defined here for convenience.

The term "asset," refers to an item of value. Assets can include, but are not limited to, properties (such as homes, apartments, and condos), vehicles, or other kinds of consumer goods.

As used herein, a user-owned asset refers to any asset that is currently, or has been previously, owned by a user. These can include, for example, any vehicles owned by a user and/or any properties owned by a user. In some cases, users may not outright own assets, but instead may rent or lease these assets. Such assets may be referred to as user-leased assets. Moreover, for properties that have been occupied by a user, including both rented or owned properties, the term "user-occupied" assets may be used. More broadly, the term "user-specific" assets may refer to any collection of user-owned, user-occupied, or user-leased assets, and generally includes any assets that can be reliably identified with a user (and with which a user may be especially familiar).

The term "user identifier" includes any information that can be used to identify a user, such as a username, an email address, or any other suitable key or code.

As used herein, the term "CAPTCHA challenge" refers to a particular implementation of CAPTCHA to determine if input provided to a system is most probably input generated by a human or input generated by a machine. Thus, in the exemplary embodiments, a CAPTCHA challenge may be a particular CAPTCHA test implemented on a webpage that asks a user to identify one or more images that include user-owned (or, more broadly, user-specific) assets.

FIG. 1 is a schematic view of an architecture 100 that can be used to both identify user input as originating from a human or a computer, and simultaneously help authenticate the user. Referring to FIG. 1, architecture 100 includes a computing system 102 that can build and execute CAPTCHA challenges. These CAPTCHA challenges can be used to allow or deny access to users operating from a remote computing system. Computing system 102 may include processors 104 and memory 106. Memory 106 may comprise a non-transitory computer readable medium. Instructions stored within memory 106 may be executed by the one or more processors 104.

Computing system 102 further includes an interface module 110, which facilitates interfacing with users on a remote computing device. Additionally, computing system 102 includes a data gathering module 112 that facilitates gathering data from remote systems. In some cases, data gathering module 112 is configured to gather data for user-specific CAPTCHA datasets, as described in further detail below.

Computing system 102 can also include CAPTCHA module 114, which facilitates generating and executing new CAPTCHA challenges using user-specific datasets.

In some embodiments, computing system 102 can include computer vision module 115. This module may be comprised of various machine learning algorithms for performing computer vision tasks, such as object detection and object recognition. Any suitable machine learning algorithms could be used, including deep neural networks, transformers or other suitable algorithms.

Computing system 102 can also include datastore 116, which stores user-specific CAPTCHA datasets. In some cases, datastore 116 may be a standalone database. Although datastore 116 is shown as stored within memory 106 of computing system 102, it may be appreciated that in other embodiments datastore 116 could be hosted on a separate computing system (including a remote server).

As seen in FIG. 1, computing system 102 is in communication, via a network 140, with a remote computing system 120 and one or more remote servers (server 130 and server 132).

Remote computing system 120 may be any computing device that can present CAPTCHA challenges generated by computing system 102 to a user. Moreover, remote computing system 120 can receive input pertaining to the CAPTCHA challenge, from a user. In some cases, a CAPTCHA challenge could be sent to, and executed by, remote computing system 120. In other cases, some parts of the CAPTCHA challenge could be executed by other computing systems.

Computing system 102 may retrieve various kinds of information from external systems, such as server 130 and server 132. In one embodiment, computing system 102 may retrieve data specific to a user or a user's account with a third party. For example, a user could be a customer of an insurance company, financial company, or some other company that keeps records, including records of purchases, for the user. This user account data could be stored on server 130. In some cases, computing system 102 may have permission to request and retrieve various kinds of user information from server 130, including historical information about user-specific assets.

In some embodiments, computing system 102 may retrieve data related to various user owned (or previously owned) assets. More specifically, computing system 102 may be configured to retrieve images of user owned (or previously owned) assets. These images could be collected from various online resources, represented here by server 132.

The operation of the exemplary architecture is as follows. First, the system may construct a user-specific CAPTCHA dataset that can be used to provide customized CAPTCHA challenges for a user. To do this, computing system 102 may interface with a user via remote computing system 120. For example, a user could load a browser page at remote computing system 120 that is generated, in part, by interface module 110. The page may include questions about the user's history of ownership (or renting, leasing, and/or occupation) of real estate, vehicles, and/or other consumer goods.

Figure 2:
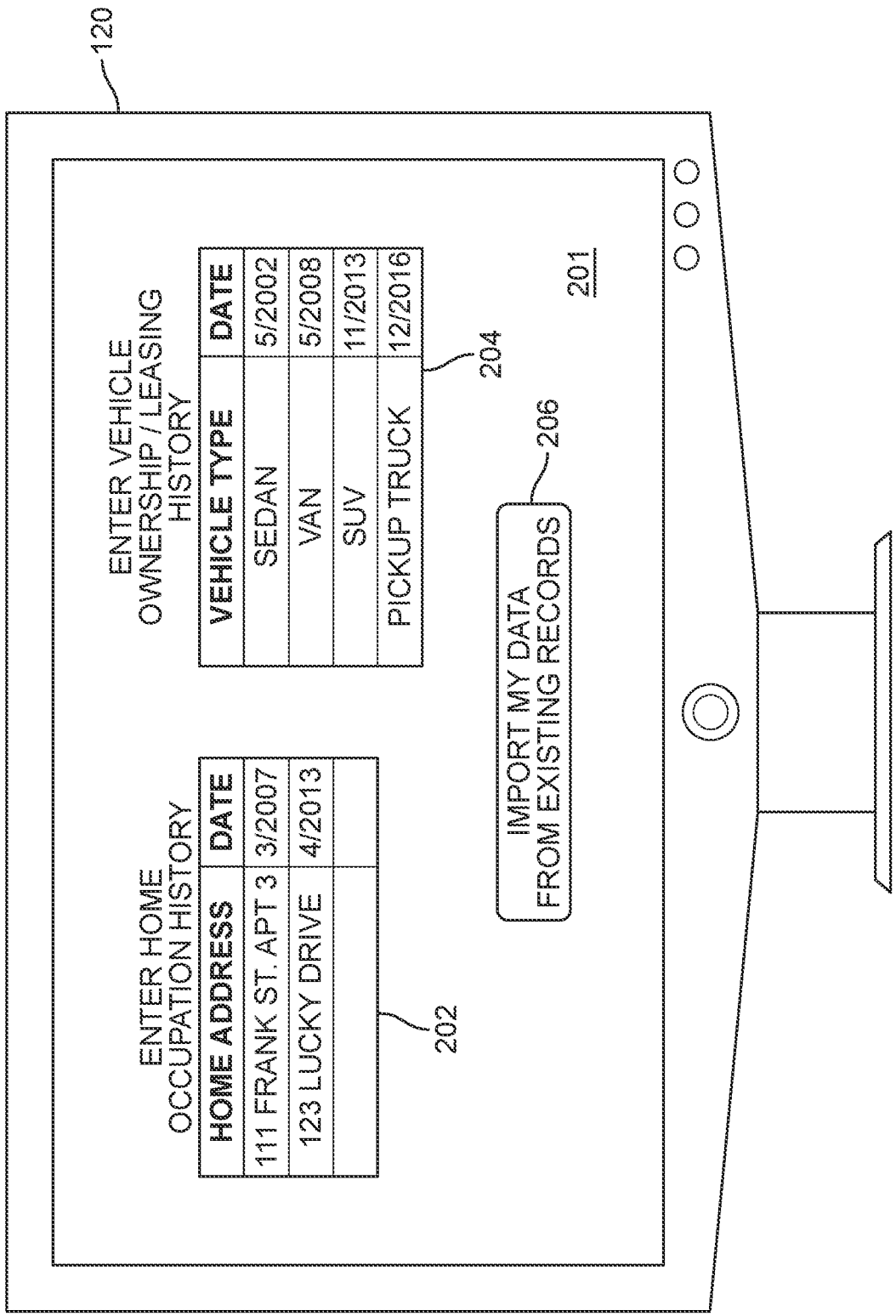
FIG. 2 is a schematic view of an online page where users can enter information about assets they have owned, leased, or occupied, according to an embodiment.

As an example, FIG. 2 shows an exemplary webpage 201 displaying forms that a user can fill out. Specifically, the user is asked to enter information about any homes they have occupied (including homes they have owned and rented) at first form area 202 of webpage 201. In addition, the user is asked to enter information about any vehicles they have owned (or leased) at second form area 204.

In some cases, rather than manually enter in this information, a user could select button 206, which causes the system to automatically import this historical ownership data into the fields. Such a configuration may be possible when one of the systems (such as computing system 102, remote computing system 120, or an intermediate gateway system) has access to account information for the user. In one example, computing system 102 has access to the user's insurance account information, which may be stored at server 130. Because insured parties are required to disclose the properties and/or vehicles they are having insured, the insurance company may have a historical record of all previous vehicle and/or property purchases.

For purposes of clarity, the exemplary home occupation form requires only a home address and a date of purchase (or date of occupation) from a user. Additionally, the exemplary vehicle ownership/leasing form requires only a vehicle type (such as a Sedan, Van, SUV, Pickup Truck, Station Wagon, or other suitable vehicle type) and date of purchase (or date of leasing). However, in other embodiments, users may be required to enter more specific information. For vehicles this could include vehicle make, vehicle model, vehicle color, vehicle trim, vehicle year, as well as any other suitable information. For homes, this could include information about the style of house, exterior color, presence of garage, lot size, or other suitable information.

The requested information may be selected so that a suitable image of the property, vehicle, or other consumer good can be retrieved. As used herein, the term "suitable image" with regards to an asset (such as a property, vehicle or other consumer good) refers to an image of an asset that can be readily identified by the user as an asset they have previously (or currently) owned, leased, or otherwise occupied. It may be appreciated that it may not be feasible for a system to gather an actual image of the specific asset owned by the user. However, in such cases, the image of a substantially similar asset could be retrieved. For example, if a user enters "green sedan" into the ownership field, then the system could use an image of any green sedan as a suitable image to represent the user's asset. On the other hand, if a user provides more specific information, such as the make and model of the vehicle, the system may attempt to retrieve only images of green sedans of the specific make and model.

Once images for all the assets listed by the user in one or more forms are gathered by data gathering module 112, they may be stored in memory. In particular, these asset images, along with the occupation/ownership/leasing dates associated to each asset, may be stored as user-specific CAPTCHA datasets in datastore 116.

With the user-specific CAPTCHA datasets constructed and stored in memory, the system can make use of these datasets to generate CAPTCHA challenges that can provide both user authentication, as well as determine if the user's input is human generated input or machine generated input.

Figure 3:
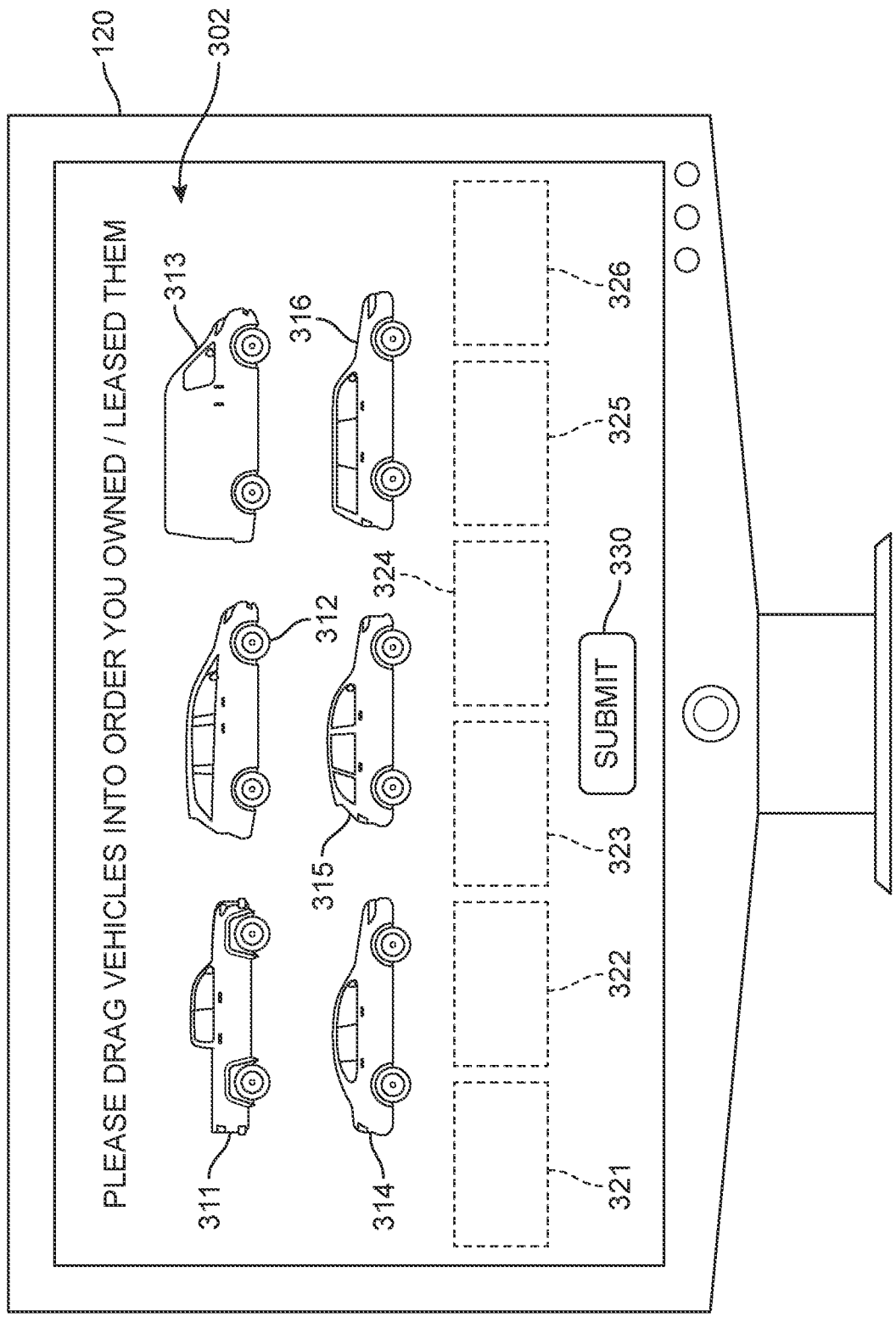
FIG. 3 is a schematic view of an online page where a CAPTCHA challenge is displayed for a user, according to an embodiment.

In FIG. 3, a CAPTCHA challenge is presented for a user, who is attempting to access a particular computing resource (such as account information stored on another server). The CAPTCHA challenge may be generated by CAPTCHA module 114 (see FIG. 1). Here, CAPTCHA challenge 302 is presented to the user via remote computing system 120. In some cases, interface module 110 of computing system 102 may facilitate displaying CAPTCHA challenge 302 on remote computing system 120.

In this example, CAPTCHA challenge 302 uses images of six different vehicle types: truck image 311, minivan image 312, commercial van image 313, sedan image 314, SUV image 315, and station wagon image 316 (or simply "wagon image 316"). Here, at least some of the displayed images are representative of previous vehicles that the user has owned/leased. The CAPTCHA challenge prompts drag the displayed vehicles into the order the user has owned them. This requires the user to drag one or more of the displayed images to one or more of the open slots at the bottom of the page. These include slot 321, slot 322, slot 323, slot 324, slot 325, and slot 326. The user is intended to press the submit button 330 once they have organized all vehicles they have owned into chronological order with respect to the date of purchase (or earliest date of ownership).

It may be appreciated that not all of the vehicles displayed may be images of vehicles a user has previously owned/ leased. In such cases, only a subset are vehicles owned/ leased by the user, while images of other kinds of vehicles are added to increase the complexity of the challenge. This means that not all of the displayed images may be used in the final sequence of vehicle images.

For purposes of illustration, the vehicle images are drawn generically. Depending on the information provided by the user, as well as the resources available for gathering vehicle images, the specificity of the images used could vary. For example, in some cases, the vehicle images could comprise schematic images, such as vector-based images. In such cases, a system could retrieve images for various vehicle types from a database of such schematic vehicle images. In other embodiments, the vehicle images could be photographs or high-resolution design images for particular vehicles. These images could be retrieved from vehicle manufacturing websites, vehicle dealer websites, or from other sources, and stored in a database.

Figure 4:
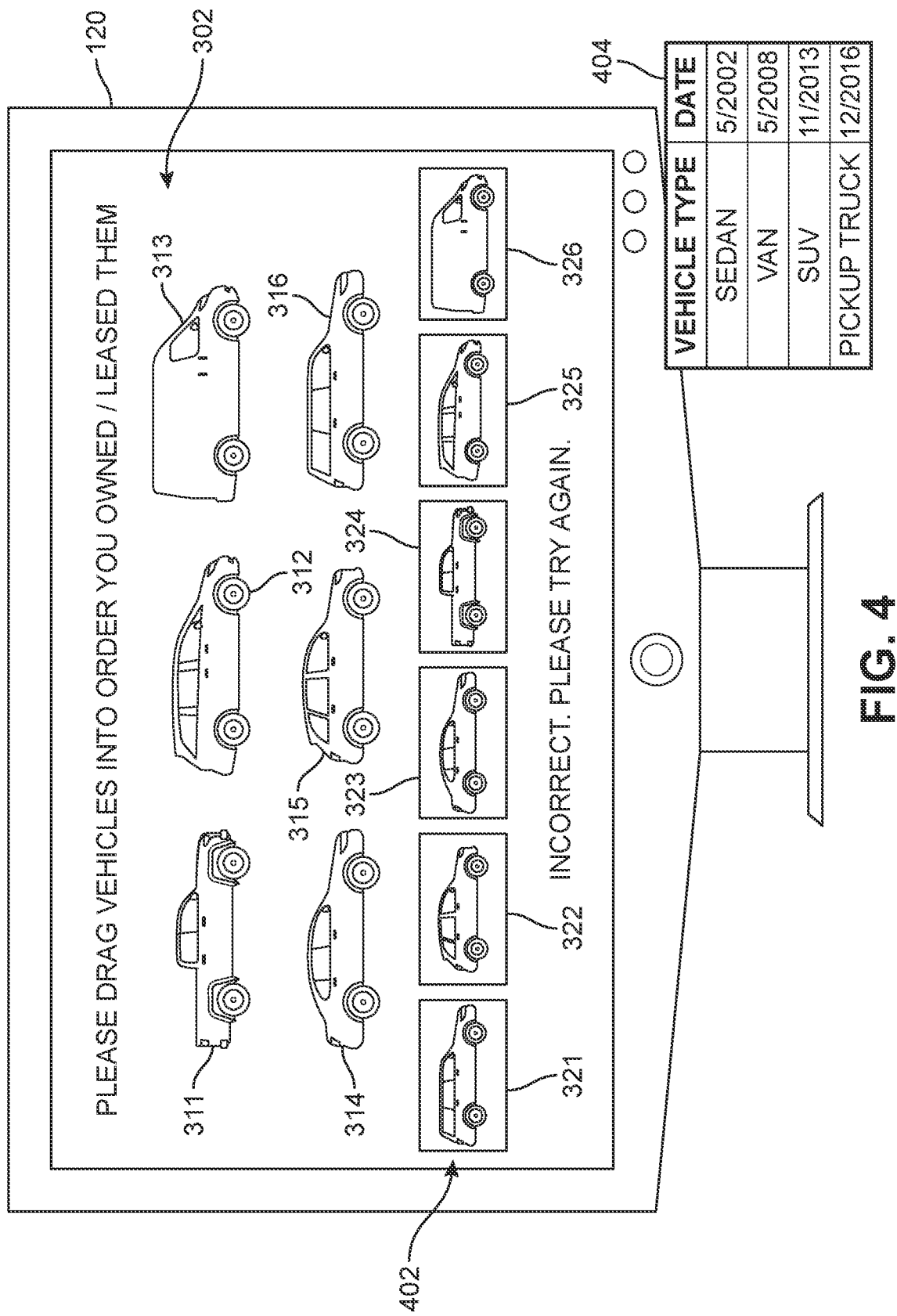
FIG. 4 is a schematic view of an unsuccessful attempt to solve a CAPTCHA challenge, according to an embodiment.
Figure 5:
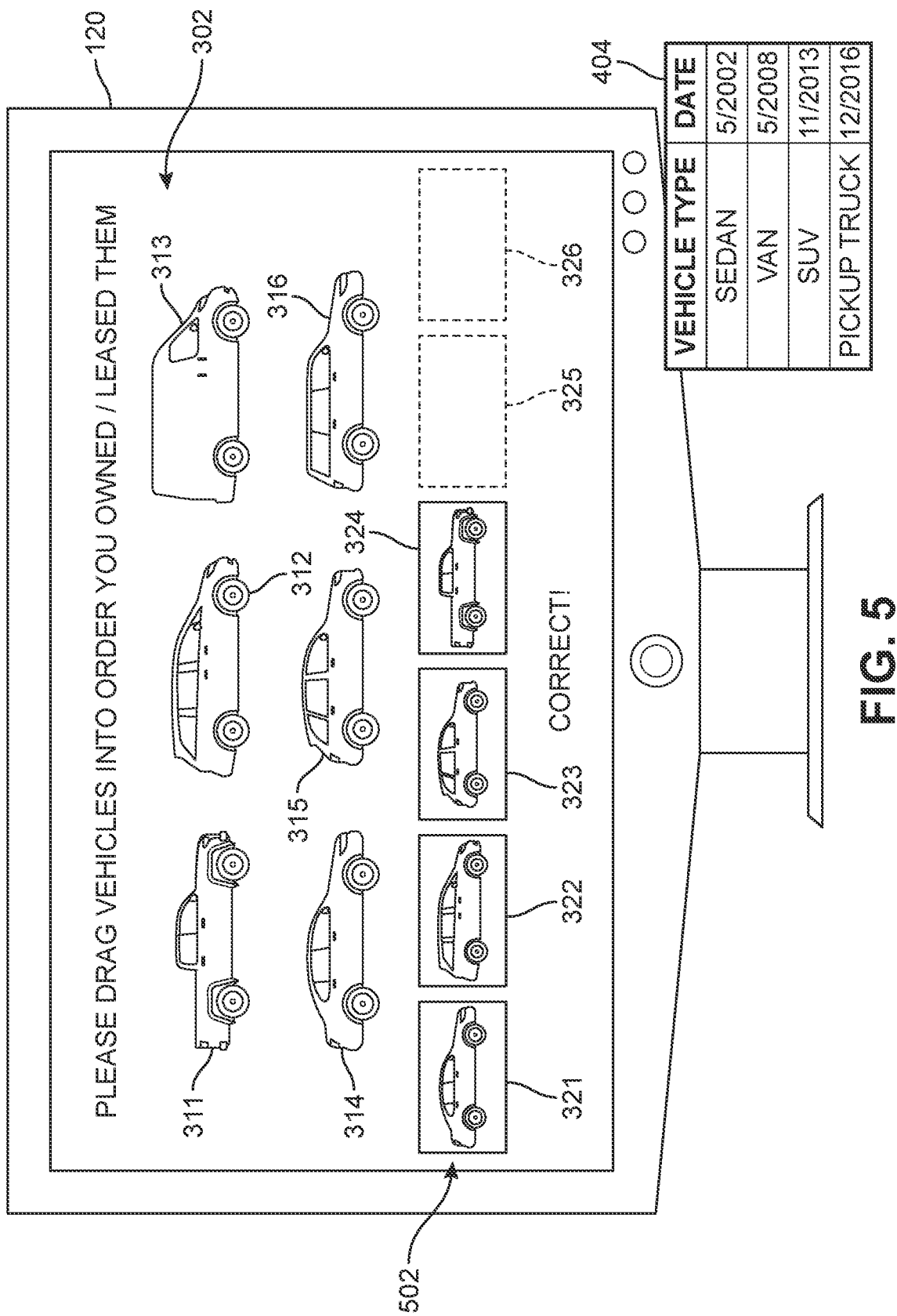
FIG. 5 is a schematic view of a successful attempt to solve a CAPTCHA challenge, according to an embodiment.

FIGS. 4-5 show two attempts by a user to solve the CAPTCHA challenge, which is based on their vehicle ownership history. For reference, the information entered by the user during the stage of constructing the user-specific CAPTCHA datasets is shown in FIGS. 4-5 as vehicle ownership data 404.

In FIG. 4, the user has entered a sequence of vehicles 402 that is determined to be incorrect. For example, the user has placed wagon image 321 as the first entry (slot 321) in the sequence, but vehicle ownership data 404 indicates that the user has never owned a station wagon. Likewise, the user has placed commercial van image 326 as the last entry (slot 326) in the sequence, but vehicle ownership data 404 indicates that the user has never owned a commercial van. Furthermore, of the four vehicles that the user has owned, the ordering of the corresponding vehicle images does not match the correct chronology.

In FIG. 5, the user has entered another sequence of vehicles 502 that is determined to be correct. In this case, the user has placed four images in sequence, including sedan image 321, minivan image 322, SUV image 323, and pickup truck image 324. This sequence matches the correct chronology as indicated in vehicle ownership data 404.

At this point, having entered the correct CAPTCHA sequence, the user may be granted access to the desired computing resource.

In another embodiment, rather than use images of vehicles, a system could use images of properties occupied by a user. In this case, the images could be schematic images that provide a user with information about the general type of property (house or condo, for example). In other cases, the images could be extracted from online real estate sites that generally store photographs of many homes that are on or off the market.

In still embodiments, a system could use a mixture of vehicle images and property images. That is, a CAPTCHA challenge with user-specific CAPTCHA datasets need not be limited to a images from a single asset class.

The previous example shows a CAPTCHA challenge that requires users to put user-specific assets in chronological order. That is, the users are required to provide a particular sequence of images. In other embodiments, the user may only be required to identify (but not order) images with user-specific assets.

Figure 6:
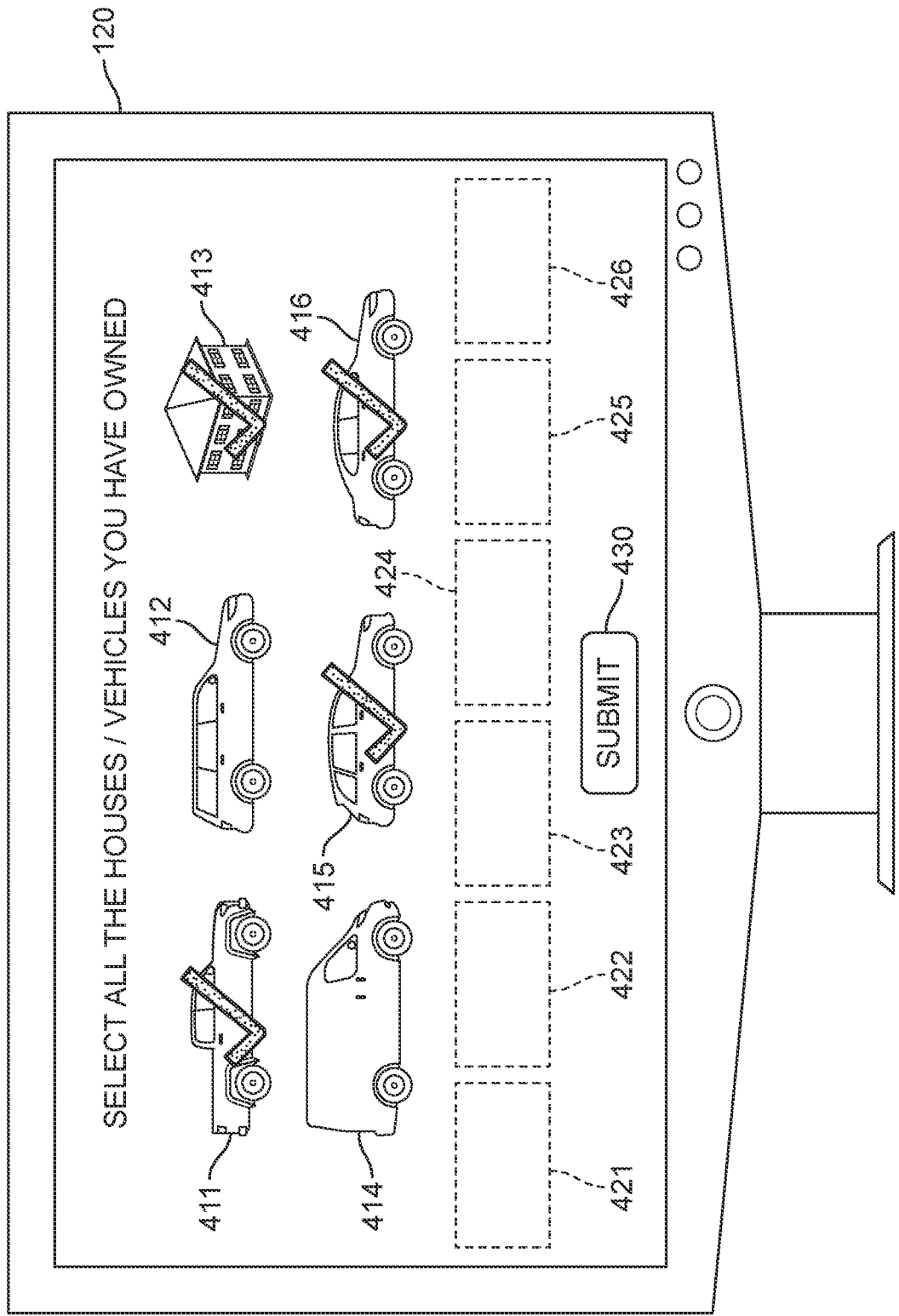
FIG. 6 is a schematic view of an online page where a CAPTCHA challenge is displayed for a user, according to an embodiment.

In another example, shown in FIG. 6, the CAPTCHA challenge provides a user with six displayed images (first image 411, second image 412, third image 413, fourth image 414, fifth image 415, and sixth image 416). These include a mix of property and vehicle images. The user is instructed to select only those properties or vehicles that they have owned. In this case, the user has correctly selected first image 411, third image 413, fifth image 415 and sixth image 416, which correspond to properties and vehicles the user has owned.

Figure 7:
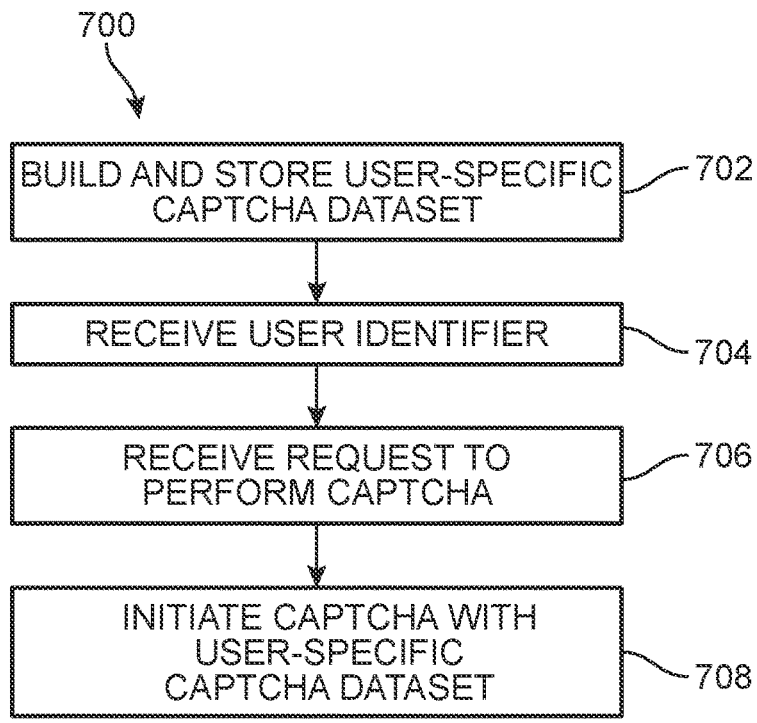
FIG. 7 is a view of a process for building and implementing user-specific CAPTCHA challenges, according to an embodiment.
Figure 8:
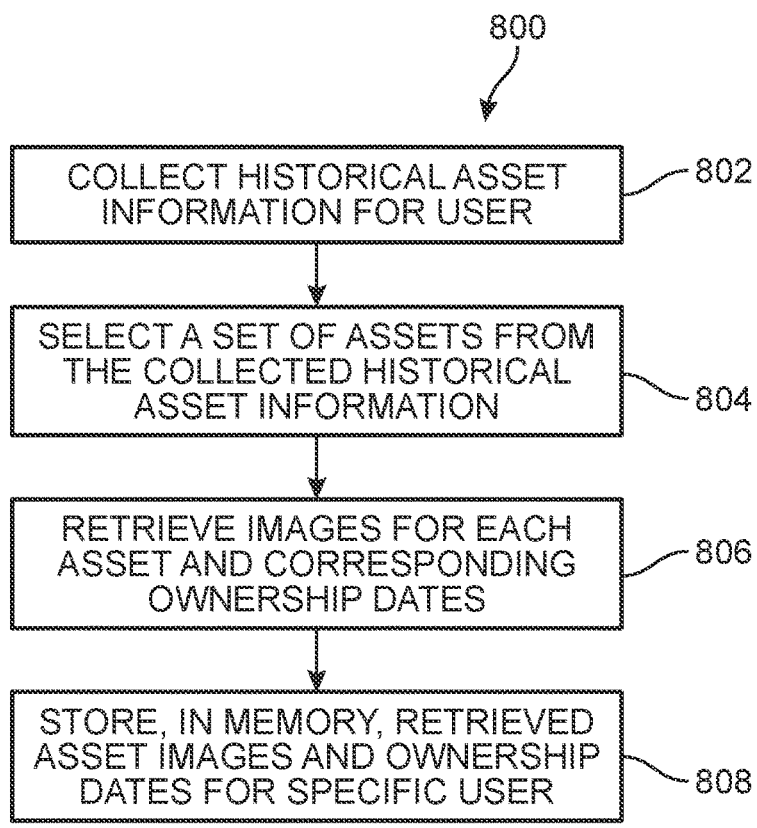
FIG. 8 is a view of a process for building user-specific CAPTCHA datasets, according to an embodiment.
Figure 9:
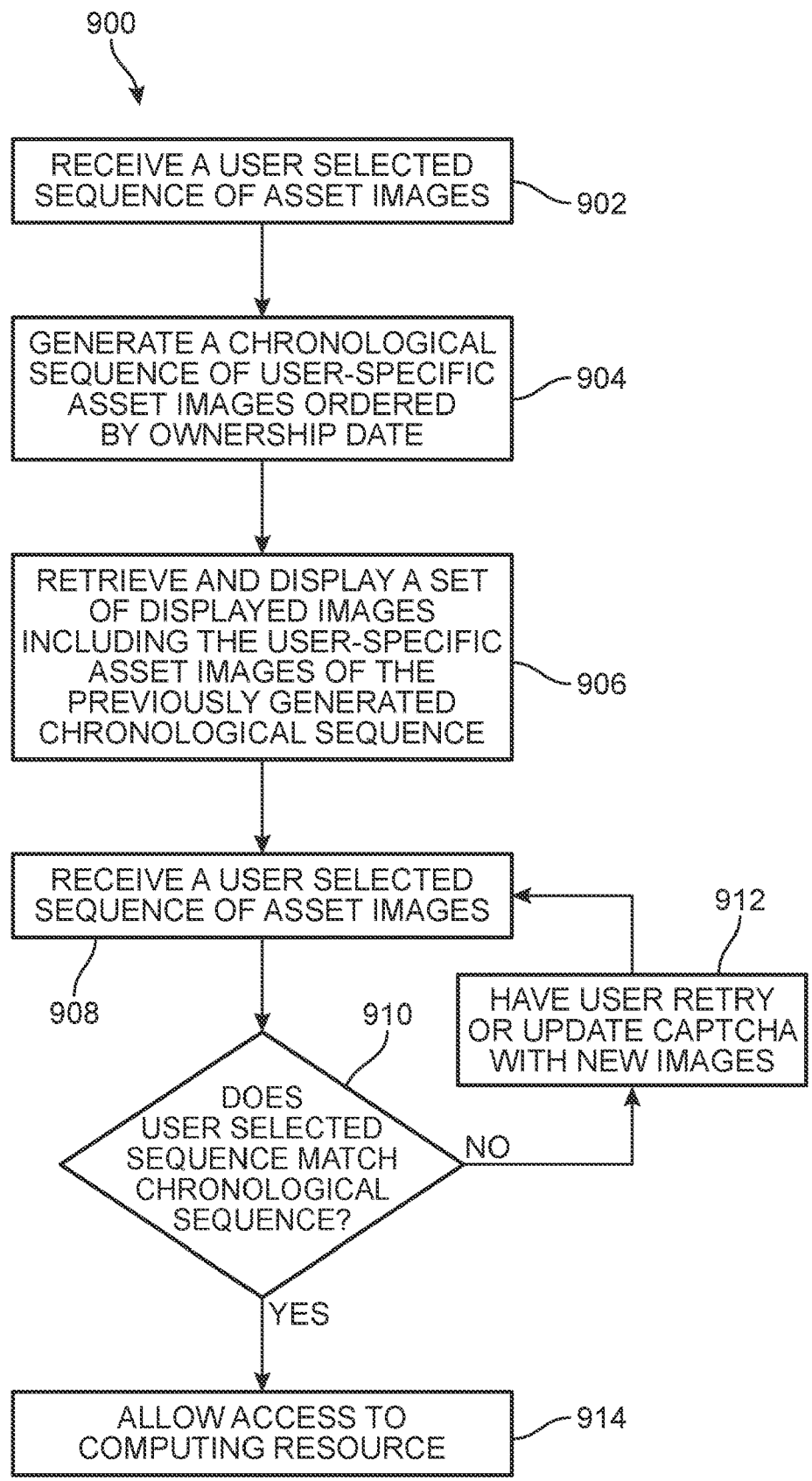
FIG. 9 is a view of a process for implementing a CAPTCHA challenge with a user-specific CAPTCHA dataset, according to an embodiment.

FIGS. 7-9 are schematic views of various processes that may be used to implement a method to both identify user input as originating from a human or a computer, and simultaneously help authenticate the user. It may be appreciated that one or more steps of these processes could be performed by a suitable computing system, such as computing system 102 of FIG. 1. Moreover, one or more steps could be performed by suitable modules of a computing system. These include interface module 110, data gathering module 112, CAPTCHA module 114, and computer vision module 115. Moreover, in performing these methods, computing system 102 may communicate with computing system 120 as well as server 130 and server 132.

Referring first to FIG. 7, a general process 700 begins with step 702, where system builds and stores a user-specific CAPTCHA dataset. Once the dataset is built and stored, a user identifier may be received in step 704. This may occur when a user attempts to access a computing resource such as a financial account page. The user could enter, for example, a username or email address as a first step of logging in to the computing resource.

When a user attempts to gain access to a computing resource, a request may be made to the system that generates CAPTCHAs (for example, computing system 102 of FIG. 1) in step 706. As part of the request, the user identifier could be sent. This request could be made by the user's own device (for example, remote computing system 120) or by another computer. For example, a remote server that controls access to the desired computing resource may send a request to the system to generate a new CAPTCHA challenge.

In response to receiving a request for a new CAPTCHA challenge, a system could generate a new CAPTCHA challenge in step 708. Specifically, a CAPTCHA challenge is created based on the user-specific CAPTCHA dataset that corresponds to the received user identifier. The actual execution of the CAPTCHA challenge could be done at the system that generates the CAPTCHA challenge (for example, computing system 102), or by another system, such as a remote server.

FIG. 8 details a process 800 of building and storing a new user-specific CAPTCHA dataset. Starting in step 802, the system may collect historical asset information for a user. In some cases, this may include having a user manually enter historical asset information into fields on a webpage or within an application (as in FIG. 2). In other cases, this may include automatically retrieving information about vehicles, properties, or other consumer goods owned by a user. For example, the system may have access to a user's insurance account, which may include data about properties and/or motor vehicles the user has previously owned, leased, or occupied.

In step 804, the system can select a set of assets from the collected historical asset information. For example, the system could select a set of vehicles from the collected historical asset information. Alternatively, the system could select a set of properties from the collected historical asset information. In still other cases, the system could select a set comprising a mixture of different assets classes, such as motor vehicles and properties. Moreover, during this step, the system could select a predetermined maximum number of assets from all assets of a particular asset class (such as vehicles or properties). During this step, the system may also ensure that the selected set of assets includes a minimum number of assets, as a CAPTCHA challenge may require at least a minimum number of asset images that correspond to user-specific assets, to achieve a sufficient level of accuracy. Thus, if a user has only owned one previous vehicle, the system may decide that the set of assets should not include vehicles, or should include vehicles and assets from another asset class.

In step 806, the system retrieves images for each asset. Here, the system could query a curated database of different kinds of asset images, which could be maintained by a third party. Alternatively, the system could utilize a search engine to find images for each asset. In some cases, the system could retrieve images from historical information that has been previously stored for the user. For example, a user's insurance company may already have images of the user's vehicles and properties stored for underwriting purposes. In such a situation, the system could obtain those images.

In some cases, the system may perform a general query for images that match details about the selected assets. For example, if the set of assets includes different vehicles owned by the user, the system could automatically search for images that match the various different vehicles. Here, the specificity of the images retrieved may be determined by whatever information is provided for each asset. If a user enters only a generic vehicle type for each asset (such as truck or van), then the system could retrieve images for the generic vehicle type (that is, images of a generic truck or generic van). If the user has specified a make and model, the system could search for vehicles of a specific make and model. Likewise, if the user has specified a particular color, the system could search for vehicles of a particular color.

Also, in step 806, the system may collect the corresponding ownership dates for each asset. These may be retrieved from a form filled out by the user, or may be retrieved automatically from another source.

In step 808, the system stores, in memory, the retrieved asset images and ownership dates for the specific user associated with a specific user identifier.

FIG. 9 details a process 900 of implementing the requested CAPTCHA challenge using the user-specific CAPTCHA dataset. Starting in step 902, the system may retrieve the user-specific CAPTCHA dataset according to the user identifier (for example, the user identifier provided in step 704 of process 700). Next, in step 904, the system could generate a chronological sequence of user-specific asset images ordered by ownership date. Here, it may be appreciated that this chronological sequence may simply be an ordered list that contains references to the different asset images. The list could store pointers to the images, or simply keys that uniquely identify the different images. In one example, the generated sequence may be a list such as "['sedan', 'minivan', 'SUV', pickup truck']". Here the keys are references to particular asset images that will be displayed as part of the challenge, and the order is chronological according to ownership date.

As part of step 904, the system may use all of the images in the user-specific CAPTCHA dataset, or only a subset of those images.

In step 906, the system retrieves (from memory) and displays a set of displayed images for a user. The displayed images include the user-specific asset images referenced in the generated sequence of step 904. In some cases, the displayed images could also include some images that do not correspond to asset images referenced in the generated sequence. Such 'dummy' images could be provided to increase the difficulty of the challenge.

In step 908, the system may receive a user-selected sequence of asset images. In practice, this set is created when a user manipulates the displayed images in some way to indicate a particular sequence of assets ownership, as in the examples of FIGS. 4 and 5. Information about this sequence is returned to the system when the user hits 'submit'.

In step 910, the system can check the user-selected sequence against the chronological sequence generated in step 906.

If the sequences do not match, the system proceeds to step 912. At this point, the user may be given another chance to enter the correct sequence. Alternatively, the system could generate a new sequence and provide an updated CAPTCHA challenge for the user to solve. Step 912 can be repeated until the user has solved the CAPTCHA, or else the system determines that too many incorrect attempts have been made and locks the user out for a predetermined time.

If the sequences match in step 910, the system proceeds to step 914. The system then allows the user access to the desired computing resource.

In some embodiments, as described above, user-specific CAPTCHA datasets can include copies of asset images that have been previously retrieved by the system. These asset images can then be retrieved and used to build user-specific CAPTCHA challenges. In other embodiments, rather than storing actual images as part of the datasets, the system can store references to images that are themselves stored elsewhere, and which can be retrieved at a later time by the system implementing the CAPTCHA challenge.

For purposes clarity, the examples described above have used simple images of different vehicle types and property types. In some cases, these types of images may be too simplistic so that a sophisticated bot could easily recognize them and identify them as corresponding to a particular vehicle type. Since a goal of CAPTCHA systems is to prevent a bot from easily identifying either part of a text or part of an image, some embodiments could utilize processes for incorporating more complex images that are not easily susceptible to object detection and recognition.

Figure 10:
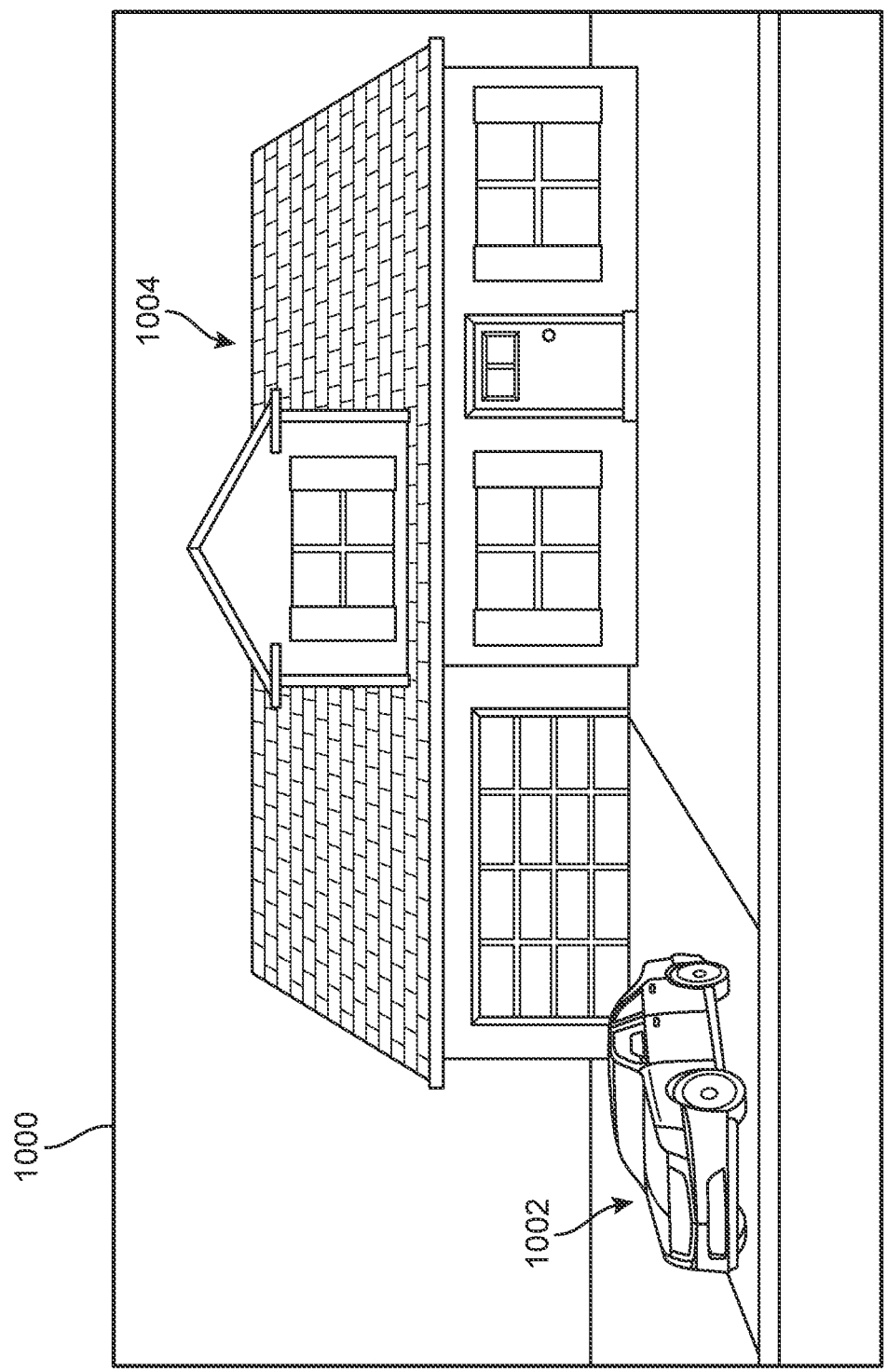
FIG. 10 is a schematic view of an image for use in a CAPTCHA challenge, according to an embodiment.

FIG. 10 is an example of a complex image 1000, which is not easily amenable to object detection and recognition. Image 1000 comprises a photo of a house 1004 with an SUV 1002 parked out front. A user who is familiar with either the house and/or the SUV could easily identify them within the image. However, a bot may have a difficult time discerning the house or car. And even if the bot can detect that there is a car or house in the image, it is unlikely to be able to identify information such as the vehicle's make and model, or the style of house.

Figure 11:
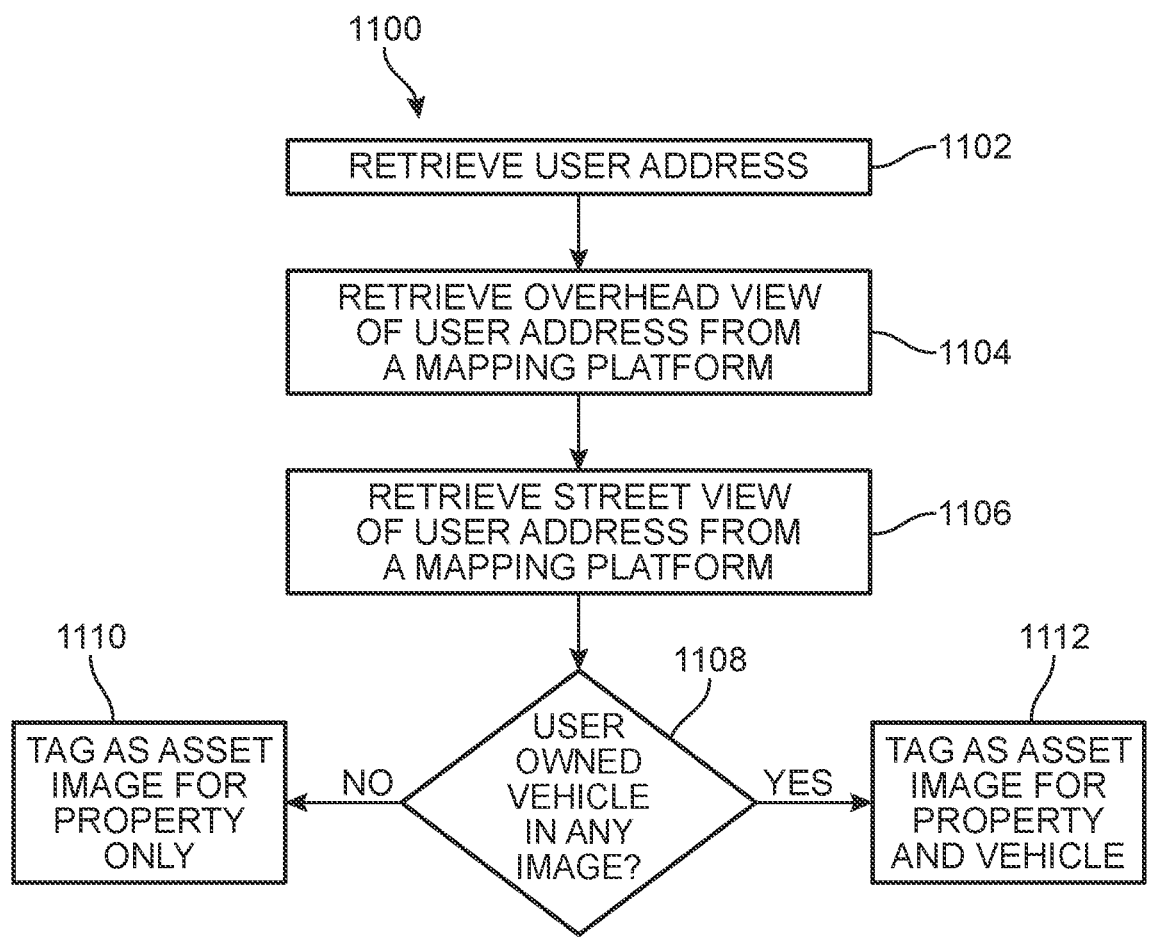
FIG. 11 is a view of a process for retrieving asset images from a mapping platform, according to an embodiment.

Therefore, in some embodiments, each user-specific CAPTCHA dataset may comprise complex images, such as complex image 1000, in which the particular asset in question is not easily detectable within the image.

Where such complex images may be used, the task of retrieving appropriate images may be more challenging. FIG. 11 presents one possible process 1100 for obtaining images that include selected assets for a user, including houses and/or vehicles. This process leverages existing online mapping platforms, which may be publicly available, for retrieving images that may include a selected property and/or vehicle.

The method starts at step 1102, where a user address is retrieved. This address may be an address for a previously owned property that has been entered by the user during the process of building a user-specific CAPTCHA dataset.

Next, in step 1104, the system may attempt to retrieve overhead views (images) of the user address from a mapping platform. In step 1106, the system may attempt to retrieve street views of the address from a mapping platform. Here, a 'street view' image is one taken from the ground, often by mobile vehicles that drive around and capture such images. Overhead views, by contrast, may generally be captured by satellites, or in some cases, aerial vehicles. Because the mapping platform has likely already identified these images as containing some view of the selected address, the system may simply infer that these images (satellite or ground-based) include the desired property.

In some cases, overhead and street views retrieved from mapping platforms may often include vehicles parked on or near the premises. In step 1110, the system can attempt to determine if the user owned vehicle is present in any of the images that have been retrieved for the specific address. In some cases, the system can use object recognition algorithms that have been tuned to search for specific kinds of vehicles, such as vehicles of a specific type, color, or other characteristic known to the system. In other cases, the system may actually query a user (or other party) to see if the user's vehicle is present in any of the images. For efficiency, the system could first use object recognition algorithms to identify images that contain the user's vehicle with a high probability, before having a human confirm that the vehicle is in at least one of the images.

If the system decides (in step 1108) that there is a user owned vehicle in one or more images, the system proceeds to step 1112 to tag the image as an asset image for the property and the vehicle. In this way the selected image could be used in CAPTCHA challenges associated with user properties, user vehicles, or both.

If the system decides (in step 1108) that none of the property images include a user owned vehicle, the system proceeds to step 1110 to tag the image as an asset image for the user owned (or occupied) property only.

Figure 12:
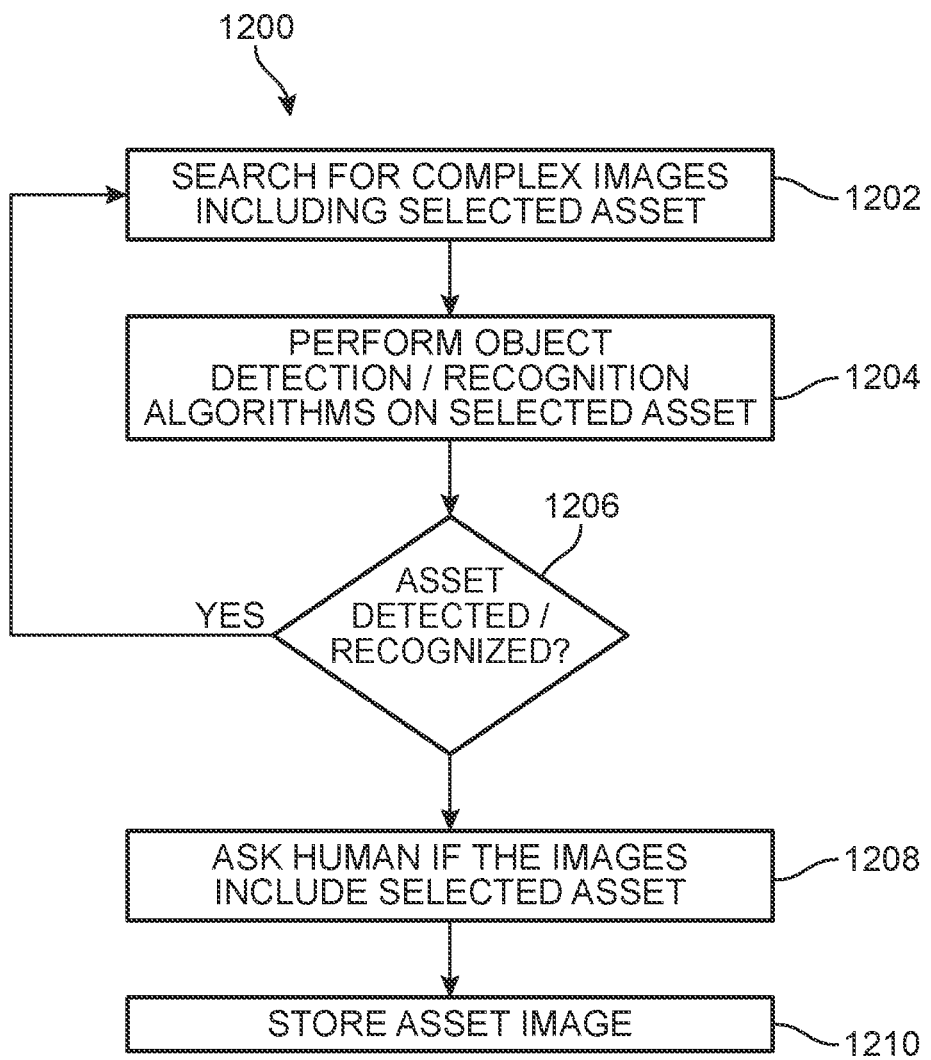
FIG. 12 is a view of a process for identifying images that include a selected asset, according to an embodiment.

FIG. 12 is directed to a more general process 1200 for finding complex images that include one or more user assets, but which are not easily cracked by existing object recognition algorithms. Starting in step 1202, the system searches for complex images including the selected asset. Here, the system could perform key word queries that rely on images that have been previously tagged using automated and/or human analysis. Next, in step 1204, the system performs object detection/recognition algorithms on the complex images found in step 1202. The purpose of this step is determine if the selected assets are readily identifiable by machines within the complex images. If they are, as determined in step 1206, the system continues searching for new complex images in step 1202. If the system cannot readily detect the selected assets, it may refer the images to a human observer to check that the complex images do in fact contain the selected asset in step 1208. If the human determines the images do contain the asset, the asset image is stored (or tagged) for later use in step 1210.

Using this exemplary process the system is able to identify complex images that contain user-specific assets for use in a CAPTCHA challenge. Moreover, by confirming, using machine learning (object detection and recognition) that the assets are undetectable by a similarly equipped machine (that is a machine using similar machine learning algorithms), the system is able to store and use images in CAPTCHA challenges where the assets are unlikely to be identified by a bot.

The processes and methods of the embodiments described in this detailed description and shown in the figures can be implemented using any kind of computing system having one or more central processing units (CPUs) and/or graphics processing units (GPUs). The processes and methods of the embodiments could also be implemented using special purpose circuitry such as an application specific integrated circuit (ASIC). The processes and methods of the embodiments may also be implemented on computing systems including read only memory (ROM) and/or random access memory (RAM), which may be connected to one or more processing units. Examples of computing systems and devices include, but are not limited to: servers, cellular phones, smart phones, tablet computers, notebook computers, e-book readers, laptop or desktop computers, all-in-one computers, as well as various kinds of digital media players.

The processes and methods of the embodiments can be stored as instructions and/or data on non-transitory computer-readable media. The non-transitory computer readable medium may include any suitable computer readable medium, such as a memory, such as RAM, ROM, flash memory, or any other type of memory known in the art. In some embodiments, the non-transitory computer readable medium may include, for example, an electronic storage device, a magnetic storage device, an optical storage device, an electromagnetic storage device, a semiconductor storage device, or any suitable combination of such devices. More specific examples of the non-transitory computer readable medium may include a portable computer diskette, a floppy disk, a hard disk, magnetic disks or tapes, a read-only memory (ROM), a random access memory (RAM), a static random access memory (SRAM), a portable compact disc read-only memory (CD-ROM), an erasable programmable read-only memory (EPROM or Flash memory), electrically erasable programmable read-only memories (EEPROM), a digital versatile disk (DVD and DVD-ROM), a memory stick, other kinds of solid state drives, and any suitable combination of these exemplary media. A non-transitory computer readable medium, as used herein, is not to be construed as being transitory signals, such as radio waves or other freely propagating electromagnetic waves, electromagnetic waves propagating through a waveguide or other transmission media (e.g., light pulses passing through a fiber-optic cable), or electrical signals transmitted through a wire.

Instructions stored on the non-transitory computer readable medium for carrying out operations of the present invention may be instruction-set-architecture (ISA) instructions, assembler instructions, machine instructions, machine dependent instructions, microcode, firmware instructions, configuration data for integrated circuitry, state-setting data, or source code or object code written in any of one or more programming languages, including an object oriented programming language such as Smalltalk, C++, python, java, or suitable language, and procedural programming languages, such as the "C" programming language or similar programming languages.

Aspects of the present disclosure are described in association with figures illustrating flowcharts and/or block diagrams of methods, apparatus (systems), and computing products. It will be understood that each block of the flowcharts and/or block diagrams can be implemented by computer readable instructions. The flowcharts and block diagrams in the figures illustrate the architecture, functionality, and operation of possible implementations of various disclosed embodiments. Accordingly, each block in the flowchart or block diagrams may represent a module, segment, or portion of instructions. In some implementations, the functions set forth in the figures and claims may occur in an alternative order than listed and/or illustrated.

The embodiments may utilize any kind of network for communication between separate computing systems. A network can comprise any combination of local area networks (LANs) and/or wide area networks (WANs), using both wired and wireless communication systems. A network may use various known communications technologies and/or protocols. Communication technologies can include, but are not limited to: Ethernet, 802.11, worldwide interoperability for microwave access (WiMAX), mobile broadband (such as CDMA, and LTE), digital subscriber line (DSL), cable internet access, satellite broadband, wireless ISP, fiber optic internet, as well as other wired and wireless technologies. Networking protocols used on a network may include transmission control protocol/Internet protocol (TCP/IP), multiprotocol label switching (MPLS), User Datagram Protocol (UDP), hypertext transport protocol (HTTP), hypertext transport protocol secure (HTTPS) and file transfer protocol (FTP) as well as other protocols.

Data exchanged over a network may be represented using technologies and/or formats including hypertext markup language (HTML), extensible markup language (XML), Atom, JavaScript Object Notation (JSON), YAML, as well as other data exchange formats. In addition, information transferred over a network can be encrypted using conventional encryption technologies such as secure sockets layer (SSL), transport layer security (TLS), and Internet Protocol security (Ipsec).

While various embodiments of the invention have been described, the description is intended to be exemplary, rather than limiting, and it will be apparent to those of ordinary skill in the art that many more embodiments and implementations are possible that are within the scope of the invention. Accordingly, the invention is not to be restricted except in light of the attached claims and their equivalents. Also, various modifications and changes may be made within the scope of the attached claims.

We claim:

1. A computing system for determining if access should be granted to a computing resource using a Completely Automated Public Turing Test to Tell Computers and Humans Apart (CAPTCHA), the computing system comprising:
   a processor; and
   a non-transitory computer readable medium storing instructions that are executable by the processor to:
      build and store a user-specific CAPTCHA dataset, by:
         collecting historical asset information from a user, wherein the historical asset information includes information about assets that have been, or are currently, owned by the user, and storing, in memory, the collected historical asset information;
         selecting a set of assets from the collected historical asset information;
         retrieving, for each asset in the set of assets, a corresponding asset image to obtain retrieved asset images; and
         storing, in memory, the retrieved asset images, which together comprise the user-specific CAPTCHA dataset, wherein each asset image in the retrieved asset images includes a collected ownership date of a corresponding asset; and
         identifying the user-specific CAPTCHA dataset with a user identifier for the user;
      receive a user's input, the user input comprising the user identifier;
      receive a request to classify the user's input as human input or machine input; and
      perform the requested classification, by:
         retrieving a test criteria;
         retrieving the user-specific CAPTCHA dataset according to the user identifier;
         retrieving and displaying, for the user, a set of displayed images wherein the set of displayed images includes at least some images from the user-specific CAPTCHA dataset;
         receiving, from the user, a user selected set of asset images from the set of displayed images;
         using the collected ownership date for each asset image in the user-specific CAPTCHA dataset to determine a chronological sequence of user-owned asset images, including all of the asset images in the set of displayed asset images that are also included in the user-specific CAPTCHA dataset; and
         allowing access to the computing resource when the user selected set of asset images matches the test criteria; wherein the test criteria further includes requiring that the user selected set of asset images contains an ordered sequence of displayed images, from the set of displayed images, matching the chronological sequence of user-owned asset images according to ownership dates collected.

2. The computing system according to claim 1, wherein the test criteria includes requiring that the user selected set of asset images includes only images from the set of displayed images that are also included in the user-specific CAPTCHA dataset.

3. The computing system according to claim 2, wherein the test criteria further includes requiring that the user selected set of asset images includes all of the images from the set of displayed images that are also included in the user-specific CAPTCHA dataset.

4. The computing system according to claim 1, wherein the set of assets includes at least one of a property previously owned by the user or a vehicle previously owned by the user.

5. The computing system according to claim 1, wherein every image in the set of displayed images is also included in the user-specific CAPTCHA dataset.

6. The computing system according to claim 1, wherein at least one image in the set of displayed images is not included in the user-specific CAPTCHA dataset.

7. A computer implemented method for determining if access should be granted to a computing resource using a Completely Automated Public Turing Test to Tell Computers and Humans Apart (CAPTCHA), the method comprising the steps of:
   building and storing a user-specific CAPTCHA dataset, by:
      collecting historical asset information from the user, wherein the historical asset information includes information about assets that have been, or are currently, owned by the user, and storing, in memory, the collected historical asset information;
      selecting a set of assets from the collected historical asset information;
      retrieving, for each asset in the set of assets a corresponding asset image to obtain retrieved asset images; and storing, in memory, the retrieved asset images, which together comprise the user-specific CAPTCHA dataset, wherein each asset image in the retrieved asset images includes a collected ownership date of a corresponding asset; and identifying the user-specific CAPTCHA dataset with a user identifier for the user;

receiving a user's input, the user input comprising the user identifier;

receiving a request to classify the user's input as human input or machine input; and performing the requested classification, by:
retrieving a test criteria;
retrieving the user-specific CAPTCHA dataset according to the user identifier;
retrieving and displaying, for the user, a set of displayed images, wherein the set of displayed images includes at least some images from the user-specific CAPTCHA dataset;
receiving, from the user, a user selected set of asset images from the set of displayed images;
using the collected ownership date for each asset image in the user-specific CAPTCHA dataset to determine a chronological sequence of user-owned asset images, including all of the asset images in the set of displayed asset images that are also included in the user-specific CAPTCHA dataset; and
allowing access to the computing resource when the user selected set of asset images matches the test criteria, wherein the test criteria further includes requiring that the user selected set of asset images contains an ordered sequence of displayed images, from the set of displayed images, matching the chronological sequence of user-owned asset images according to ownership dates collected.

8. The method according to claim 7, wherein the test criteria includes requiring that the user selected set of asset images includes only images from the set of displayed images that are also included in the user-specific CAPTCHA dataset.

9. The method according to claim 8, wherein the test criteria further includes requiring that the user selected set of asset images includes all of the images from the set of displayed images that are also included in the user-specific CAPTCHA dataset.

10. The method according to claim 7, wherein the method further comprises: collecting an ownership date for each asset image in the user-specific CAPTCHA dataset; using the collected ownership date for each asset image in the user-specific CAPTCHA dataset to determine a chronological sequence of user-owned asset images, including all of the asset images in the set of displayed asset images that are also included in the user-specific CAPTCHA dataset; and wherein the test criteria further includes requiring that the user selected set of asset images contains an ordered sequence of displayed images, from the set of displayed images, matching the chronological sequence of user-owned asset images.

11. The method according to claim 7, wherein every image in the set of displayed images is also included in the user-specific CAPTCHA dataset.

12. The method according to claim 7, wherein at least one image in the set of displayed images is not included in the user-specific CAPTCHA dataset.

13. The method according to claim 12, wherein the collected historical asset information includes, for each asset, at least one of a vehicle type, a vehicle make, a vehicle model, and a vehicle color.

* * * * *